(12) United States Patent
Salter et al.

(10) Patent No.: US 12,296,744 B2
(45) Date of Patent: May 13, 2025

(54) BASEPLATE MOUNTING SYSTEM WITH LOCKING MECHANISM

(71) Applicant: Ford Global Technologies, LLC, Dearborn, MI (US)

(72) Inventors: Stuart C. Salter, White Lake, MI (US); Matthew B. Rutman, Canton, MI (US); Michael M. Azzouz, Farmington, MI (US); Michael Lozano, Detroit, MI (US); Jeffrey R. Sturges, Grosse Pointe Farms, MI (US); William Wurz, San Francisco, CA (US); David Brian Glickman, Southfield, MI (US); Eric Scott Levine, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 17/865,587

(22) Filed: Jul. 15, 2022

(65) Prior Publication Data

US 2023/0116745 A1 Apr. 13, 2023

Related U.S. Application Data

(60) Provisional application No. 63/254,317, filed on Oct. 11, 2021.

(51) Int. Cl.
*B60Q 1/50* (2006.01)
(52) U.S. Cl.
CPC ................... *B60Q 1/509* (2022.05)
(58) Field of Classification Search
CPC .......... B60Q 1/509; B60R 9/06; B62D 33/023
USPC ......................................... 224/324
See application file for complete search history.

(56) References Cited

U.S. PATENT DOCUMENTS

| 4,027,892 | A | * | 6/1977 | Parks | B60P 7/0892 |
| | | | | | 410/121 |
| 4,358,035 | A | * | 11/1982 | Heidecker | B60R 7/02 |
| | | | | | 414/522 |
| 5,599,055 | A | * | 2/1997 | Brown | B62D 25/2054 |
| | | | | | 410/97 |
| 8,011,692 | B2 | | 9/2011 | Friesen | |
| 8,622,266 | B2 | | 1/2014 | McMillan | |

(Continued)

OTHER PUBLICATIONS

US 10,947,009 B2, 03/2021, Brunner et al. (withdrawn)
Cargo Container Anti-Theft Alarm. Oct. 21, 2021. https://priorart.ip.com/IPCOM/000211861.

*Primary Examiner* — Peter N Helvey
(74) *Attorney, Agent, or Firm* — Vichit Chea; Carlson, Gaskey & Olds, P.C.

(57) ABSTRACT

An accessory attachment system includes a baseplate that provides an attachment interface on a support surface. The baseplate is configured to engage with at least one accessory via the attachment interface to secure the accessory to the support surface. The attachment interface provides a plurality of different mounting positions for the at least one accessory. At least one mounting foot is associated with the at least one accessory and is configured to be selectively coupled to the attachment interface to provide a desired one of the plurality of different mounting positions. The at least one mounting foot includes an adjustment feature to account for any warpage of the support surface when the at least one accessory is mounted in the desired one of the plurality of different mounting positions.

20 Claims, 6 Drawing Sheets

(56) References Cited

U.S. PATENT DOCUMENTS

| | | | |
|---|---|---|---|
| 10,583,962 B2 | 3/2020 | Brunner et al. | |
| 10,703,534 B2 | 7/2020 | Brunner et al. | |
| D895,966 S | 9/2020 | Brunner et al. | |
| D895,967 S | 9/2020 | Brunner et al. | |
| D896,517 S | 9/2020 | Brunner et al. | |
| D896,518 S | 9/2020 | Brunner et al. | |
| D897,103 S | 9/2020 | Brunner et al. | |
| D898,320 S | 10/2020 | Brunner et al. | |
| 10,962,218 B2 | 3/2021 | Plato et al. | |
| 10,981,696 B2 | 4/2021 | Brunner et al. | |
| D917,977 S | 5/2021 | Brunner et al. | |
| D918,584 S | 5/2021 | Brunner et al. | |
| D919,296 S | 5/2021 | Brunner et al. | |
| 11,008,136 B2 | 5/2021 | Brunner et al. | |
| 11,027,883 B1 | 6/2021 | Brunner et al. | |
| D920,671 S | 7/2021 | Brunner et al. | |
| D923,935 S | 7/2021 | Brunner et al. | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 2018/0312115 A1* | 11/2018 | Reed | B60Q 3/30 |
| 2020/0011097 A1 | 1/2020 | Stoncius | |
| 2020/0086829 A1 | 3/2020 | Wall et al. | |
| 2020/0149316 A1* | 5/2020 | Parker | E05B 73/0005 |
| 2021/0061187 A1* | 3/2021 | Allan | B60R 11/06 |
| 2021/0062581 A1* | 3/2021 | Allan | E06C 5/04 |
| 2021/0274900 A1* | 9/2021 | Roseborough | A45C 15/04 |

\* cited by examiner

BASEPLATE MOUNTING SYSTEM WITH LOCKING MECHANISM

CROSS-REFERENCE TO RELATED APPLICATIONS

This application claims priority to U.S. Provisional Application No. 63/254,317, which was filed on 11 Oct. 2021 and is incorporated herein by reference.

TECHNICAL FIELD

This disclosure relates generally to an attachment system and, more particularly, to an attachment system that is used to secure accessories to a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to an accessory attachment connection system, including: a baseplate that provides an attachment interface on a support surface, the baseplate configured to engage with at least one accessory via the attachment interface to secure the accessory to the support surface, and wherein the attachment interface provides a plurality of different mounting positions for the at least one accessory; and at least one mounting foot associated with the at least one accessory and configured to be selectively coupled to the attachment interface to provide a desired one of the plurality of different mounting positions, and wherein the at least one mounting foot includes an adjustment feature to account for any warpage of the support surface when the at least one accessory is mounted in the desired one of the plurality of different mounting positions.

In some aspects, the techniques described herein relate to an attachment system, wherein the attachment interface comprises a plurality of mounting holes formed within the baseplate, and wherein the at least one mounting foot has a head portion associated with the at least one accessory and a foot portion to be inserted into one of the plurality of mounting openings.

In some aspects, the techniques described herein relate to an attachment system, wherein the head portion and foot portion are coupled together with a spring-loaded fastener assembly such that the foot member can move relative to the head member along an axial direction to provide vertical compensation and to mitigate vibration.

In some aspects, the techniques described herein relate to an attachment system, wherein one of the head portion and foot portion includes a channel and the other of the head portion and the foot portion includes a protrusion that is received within the channel such that pivotal movement can occur between the head portion and the foot portion to account for the warpage.

In some aspects, the techniques described herein relate to an attachment system, wherein the protrusion extends from a base surface to a distal end, and wherein the protrusion decreases in thickness in a direction toward the distal end.

In some aspects, the techniques described herein relate to an attachment system, wherein the channel has a chamfered entrance to facilitate insertion of the protrusion into the channel.

In some aspects, the techniques described herein relate to an attachment system, wherein the foot portion includes chamfered surfaces to facilitate insertion of the foot portion into the one of the plurality of mounting openings.

In some aspects, the techniques described herein relate to an attachment system, wherein the foot portion is selectively moveable between a locked position where the at least one mounting foot cannot be detached from the baseplate and an unlocked position where the at least one mounting foot can be detached from the baseplate.

In some aspects, the techniques described herein relate to an attachment system, wherein the plurality of mounting holes are each configured to receive the foot portion such that once the foot portion is inserted through a selected one of the plurality of mounting holes, the head portion is then rotated to move the foot portion into the locked position.

In some aspects, the techniques described herein relate to an attachment system, wherein the plurality of mounting holes each have a diamond shape.

In some aspects, the techniques described herein relate to an attachment system, wherein the at least one accessory includes an interior power locking mechanism that can be wirelessly actuated.

In some aspects, the techniques described herein relate to an attachment system, the system including a position sensor and/or limit switch that can determine if the at least one mounting foot has moved to a locked position, and wherein a locking condition is wirelessly communicated to a user interface when a lock position is detected.

In some aspects, the techniques described herein relate to an attachment system, wherein the at least one accessory includes a locking mechanism that automatically locks or unlocks in response to a vehicle operation status, a vehicle location, and/or a designated type of person.

In some aspects, the techniques described herein relate to an attachment system, wherein the at least one accessory includes exterior lighting that changes based on a vehicle operation status and/or a locked/unlocked condition of the at least one accessory.

In some aspects, the techniques described herein relate to an accessory attachment connection method, including: engaging at least one accessory to an attachment interface of a baseplate that provides a plurality of different mounting positions for the at least one accessory; and selectively coupling at least one mounting foot associated with the at least one accessory to the attachment interface to provide a desired one of the plurality of different mounting positions, and wherein the at least one mounting foot includes an adjustment feature to account for any warpage of the support surface when the at least one accessory is mounted in the desired one of the plurality of different mounting positions.

In some aspects, the techniques described herein relate to an attachment method, the method including providing the at least one mounting foot with a head portion associated with the at least one accessory and a foot portion to be inserted into one of the plurality of mounting openings, and coupling the head portion and foot portion together using a spring-loaded fastener assembly such that the foot member can move relative to the head member along an axial direction to provide vertical compensation and to mitigate vibration.

In some aspects, the techniques described herein relate to an attachment method, wherein one of the head portion and foot portion includes a channel and the other of the head portion and the foot portion includes a protrusion, and further including inserting protrusion into the channel such that pivotal movement can occur between the head portion and the foot portion to account for the warpage.

In some aspects, the techniques described herein relate to an attachment method, wherein the foot portion is selectively moveable between a locked position where the at least one mounting foot cannot be detached from the baseplate and an unlocked position where the at least one mounting foot can be detached from the baseplate, and further including inserting the foot portion through a selected one of the plurality of mounting holes and subsequently rotating the head portion to move the foot portion into the locked position.

In some aspects, the techniques described herein relate to an attachment method, wherein the at least one accessory includes a locking mechanism, and further including automatically locking or unlocking the locking mechanism in response to a vehicle operation status, a vehicle location, and/or a designated type of person.

In some aspects, the techniques described herein relate to an attachment method wherein the at least one accessory includes exterior lighting, and further including changing or varying the exterior lighting based on a vehicle operation status and/or a locked/unlocked condition of the at least one accessory.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a baseplate-based accessory attachment system for a vehicle or stationary application. The system includes a baseplate that provides an attachment interface for securing accessories to the vehicle. The disclosure also provides for locking/unlocking features such that contents within the accessories can be secured. Various types of accessories can be secured to the vehicle through the attachment interface provided by the baseplate. The number and positions of baseplates can be adjusted for particular vehicles or particular needs. Additionally, the mounting interface of the accessories accounts for warpage and allows for each accessory to be mounted in different mounting orientations on the baseplate. This provides a user with a substantially modular attachment system.

There are often situations where it would be useful for the vehicle owner to be able to switch between different upfit systems to enable different functional capabilities, or to temporarily remove an upfit accessory or module to allow the module or its contents to be used off the vehicle, then reattach the module once the desired operation or task is completed. Traditional upfit integration of elements into a vehicle by mechanical, bolt-on physical attachment makes it difficult to easily change different types of accessories or modules for use in different applications. The subject disclosure provides an integration method that allows a mechanical attachment to the vehicle via a quick connect/disconnect capability.

Figure 1:
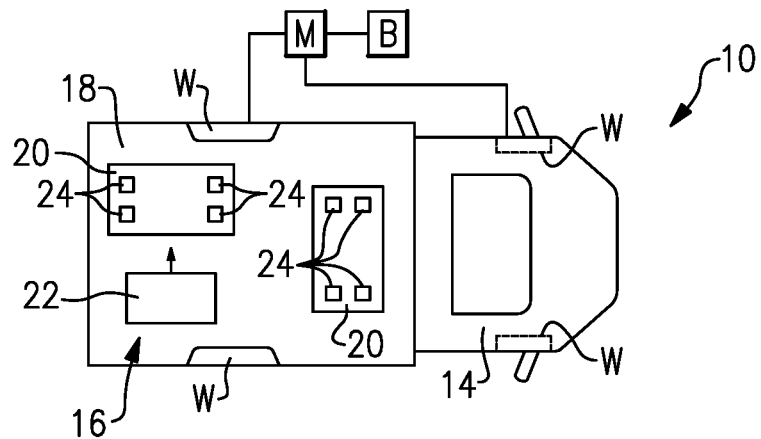
FIG. 1 illustrates a top view of a vehicle having a cargo bed equipped with baseplates that can be used to secure an accessory according to an exemplary aspect of the present disclosure.
Figure 2:
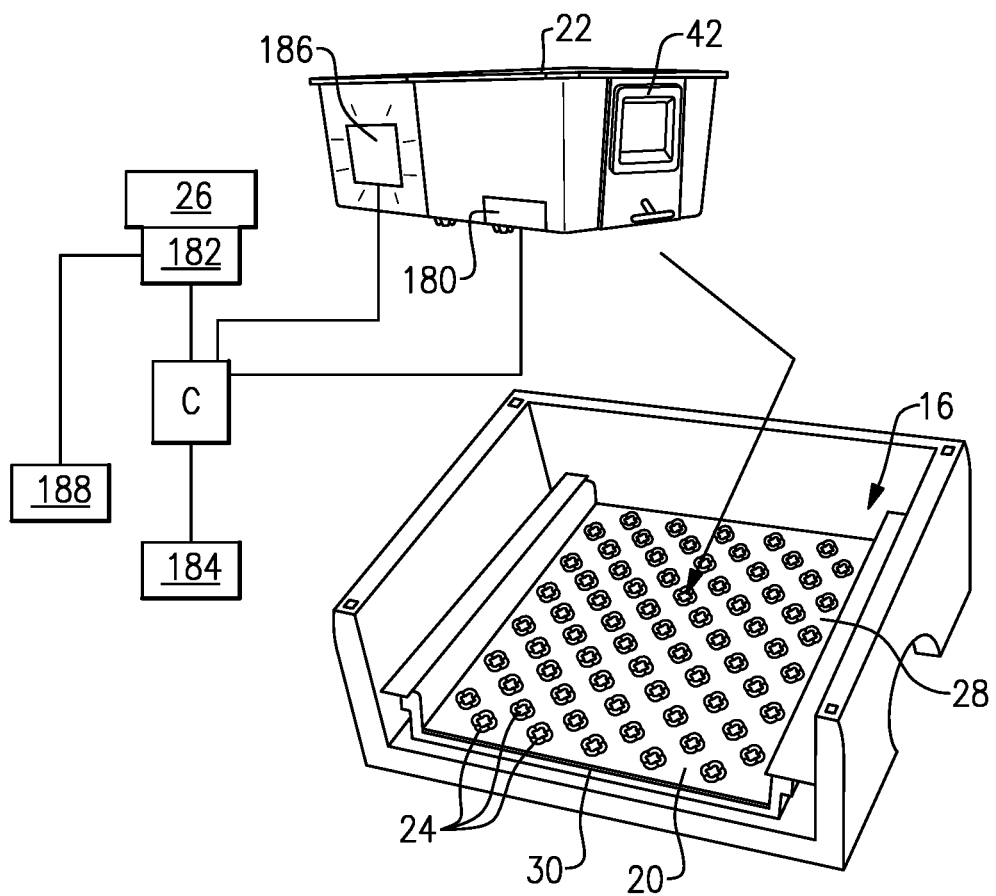
FIG. 2 illustrates an accessory comprising a lockable box that is to be coupled to a baseplate in a cargo bed.

FIGS. 1-11 disclose an exemplary embodiments of the accessory attachment system that interfaces with a baseplate. With reference to FIGS. 1 and 2, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

In the exemplary embodiment, a plurality of baseplates 20 are secured directly to the floor 18 of the cargo bed 16. The baseplates 20 can have different sizes. Various accessories and/or modules 22 can be secured to the vehicle 10 by engaging one or more of the baseplates 20. The accessories/modules 22 can include a lockable storage box that holds tools, a refrigerator, etc. The accessory 22 could be a lidded lockable container that includes a compartment for storing power tools or other items that require power or data connection.

With reference now to FIGS. 2-8 and continued reference to FIGS. 1 and 2, the accessories 22 can engage one or more of the baseplates 20 using an attachment system. In the exemplary embodiment, the attachment system includes a plurality of apertures 24 and at least one foot 26 that cooperate to provide a mechanical connection interface. The baseplate 20 is attached to a vehicle surface with an additional attachment interface that is separate from the mechanical connection interface for the accessories 22.

In this example, the baseplates 20 provide the apertures 24 and the accessories 22 include a plurality of feet 26. This could be rearranged, however, such that one or all of the feet 26 extend from the baseplates 20 and the accessories 22 provide some or all of the apertures 24.

In the exemplary embodiment, when the baseplate 20 and the accessories 22 are engaged, the feet 26 are each received within one of the apertures 24 such that the feet 26 each extend from a first side 28 of the baseplate 20, through one of the apertures 24, and past an opposite, second side 30 of the baseplate 20.

Mechanical fasteners, welds, or other methods of attachment could be used to secure the baseplates 20 to the floor 18. The apertures 24 are spaced upwardly from the floor 18 by an open gap such that the feet 26 from the accessory can be easily inserted into the baseplate 20 to attach the accessory 22 to the baseplate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory having specialized tools for the second type of job.

In the subject disclosure, the accessory 22 comprises a lockable box that is mechanically coupled to the vehicle 10 through the baseplate 20. Optionally, the accessory 22 could additionally comprise a lockable box that includes a power interface. This would allow devices within the lockable box to be powered from a vehicle power supply 44. For example, the internal device could be a refrigerated container that is powered by the vehicle 10 when the box is engaged with the baseplate 20. In another example, the devices within the lockable box could comprise rechargeable tools, which can be recharged when set within the box and coupled to a charging interface between the accessory 22 and the baseplate 20.

An example of an accessory attachment method includes the step of attaching an accessory 22 to a baseplate 20 supported by the vehicle 10 by inserting at least one foot 26 through an aperture 24 to mechanically lock the at least one foot 26 in place. In one example shown in FIGS. 5A-5B, the baseplate 20 includes four apertures 24 that are configured to receive four feet 26 of the accessory 22. The number of feet 26 can be greater than or less than four feet depending on the size of the accessory 22.

When the accessory 22 is attached to the baseplate 20, the feet 26 are inserted into the corresponding apertures 24 to mechanically attach the accessory 22 to the baseplate 20 in one of a plurality of mounting orientations. The accessory 22 is configured to be selectively detachable from one mounting orientation on the baseplate 20 such that the accessory 22 can immediately be reattached in a different one of the mounting orientations.

Figure 3:
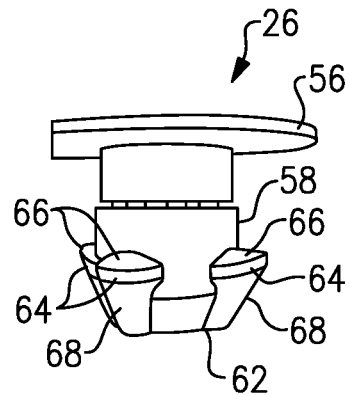
FIG. 3 is a perspective view of an accessory mounting foot for the lockable box of FIG. 2.
Figure 4:
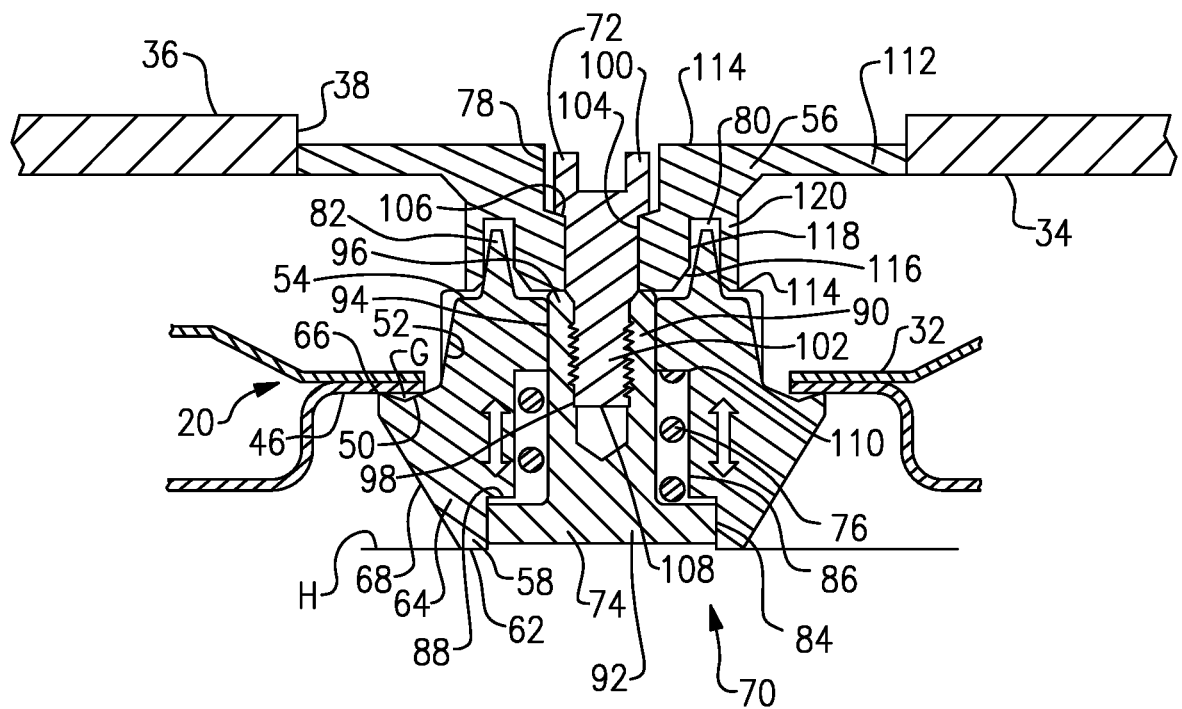
FIG. 4 is a section view of the accessory mounting foot of FIG. 3.

With reference to FIGS. 3-4, in one example, the feet 26 are configured such that secure mounting can be accomplished even with a load surface that is slightly warped. Baseplate mounting flanges (see FIG. 4) that are used to attach the baseplate 20 to the floor 18 can be slightly warped such that, when mounted in place, support and/or mounting surfaces of the baseplate 20 are not parallel to ground and/or do not provide a generally flat and planar mounting support and/or mounting surface. At least one foot 26, and perhaps all four feet 26 (possibly more for larger boxes), account for warpage in stamped and welded flanges of the baseplate 20 in that three points, not four, establish a plane. Split chamfers and open angles in channels in the feet 26 allow non-parallel alignment to the loading surface. Additionally, a split foot configuration can use internal springs to "best fit" when securing the feet 26 and provide for easier unlocking.

FIG. 4 shows a top surface 32 of the baseplate 20 and an exterior surface 34 of the accessory 22 that faces the top surface and an interior bottom surface 36 of the accessory that faces opposite the exterior surface 34. In one example, the accessory 22 includes a step-down profile or recessed area 38 that receives an upper portion of the foot 26 such that the distal end of the foot extends through the bottom of the accessory 22 and through an aperture 24 in the baseplate 20. In one example, the exterior surface of the recessed area 38 rests directly against the top surface 32 of the baseplate 20 when the foot 26 is coupled to the baseplate 20. Optionally, there may be a slight gap at the recessed area 38 with remaining portion of the exterior surface 34 being in contact with the top surface 32 of the baseplate 20. The foot 26 may also be associated with a locking mechanism 42 (FIG. 6) that can selectively be deployed to lock the box in place on the baseplate 20. The step-down in profile between a floor surface 36 of the box and locking mechanism 42 for the foot 26 provides for a better fit and reduces the possibility of damaging the locking mechanism 42.

Figure 5A:
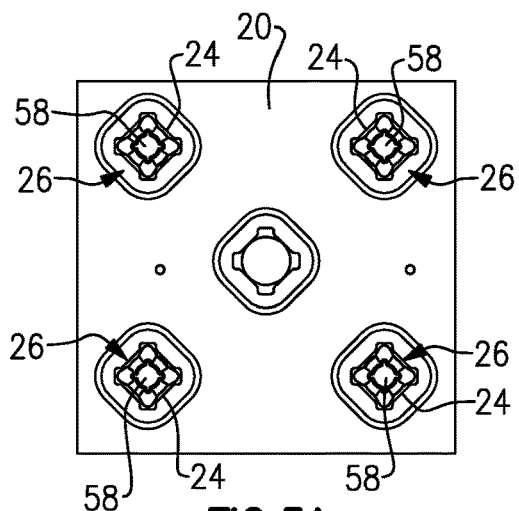
FIG. 5A is a top view of feet installed on a baseplate in an unlocked position.

In one example, each mounting foot 26 comprises a head portion 56 and a foot portion 58 that is selectively moveable between a locked position where the box cannot be detached from the baseplate 20 (FIG. 5B) and an unlocked position where the box can be detached from the baseplate 20 (FIG. 5A).

Figure 5B:
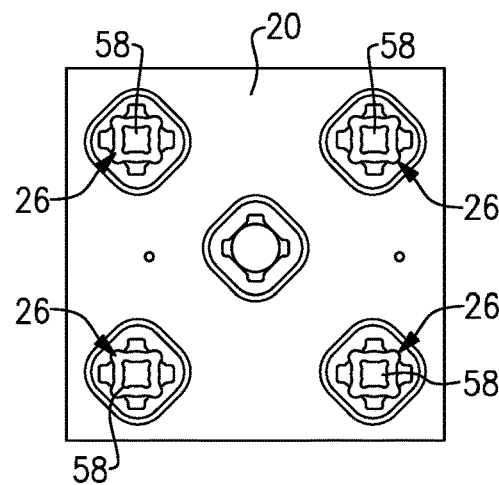
FIG. 5B is a top view of feet installed on a baseplate in a locked position.

FIG. 4 shows a mounting foot 26 inserted into an aperture 24 in the baseplate 20. Once the aperture 24 receives the foot 26, the head portion 56 is then rotated to move the mounting foot 26 into the locked position. In one example, the mounting feet and apertures 24 have a polygonal shape. In the example shown in FIGS. 3-4 and 5A-5B, the feet 26 and apertures 24 have a diamond shape. As shown in FIG. 5A, the diamond-shaped feet 26 are aligned with and inserted through the diamond-shaped apertures 24. The feet 26 are then rotated either clockwise or counterclockwise to a position where the diamond-shaped feet 26 are not aligned with the diamond-shaped apertures to lock the feet 26 in place as shown in FIG. 5B. To unlock the feet 26, the feet are rotated to align the diamond-shaped feet 26 with the diamond-shaped apertures 24 (FIG. 5A) such that the feet 26 can be detached from the baseplate 20.

As shown in FIGS. 3-4, the foot portion 58 includes beveled sides to facilitate insertion through the selected one of the plurality of apertures 24. In one example, the foot portion 58 has a distal end face 62 and protruding portions 64 spaced apart from each other about an outer periphery of the foot portion 58. The protruding portions 64 extend from the distal end face 62 upwardly to terminate at an engagement area 66. The engagement area 66 comprises a point of contact that abuts directly against a lower surface 46 of the baseplate 20 when the feet 26 are in the locked position. The protruding portions 64 gradually and continuously increase in thickness from the distal end face 62 to the engagement area 66 to provide an angled/beveled side surface 68. The angled/beveled side surfaces 68 facilitate sliding movement of the foot 26 through the aperture 24. Additionally, the protruding portions 64 can comprise resilient members that compress inwardly during insertion and then expand back outwardly one the protruding portions 64 have passed through the aperture 24. Once inserted, the feet 26 can be rotated into the locked position.

In one example, the engagement area 66 transitions into a first chamfered or angled surface 48 that extends downwardly in an inward direction toward a center of the foot 26. The first chamfered or angled surface 48 then transitions into a second chamfered or angled surface 50 that extends from an end of the first chamfered surface 48 upwardly in an inward direction toward a center of the foot 26. The second chamfered or angled surface 50 then transitions into a third chamfered or angled surface 52 that extends from an end of the second chamfered surface 50 upwardly in an inward direction toward a center of the foot 26. The third chamfered or angled surface 52 has a longer length than the first 48 and the second 50 chamfered or angled surfaces. The third chamfered or angled surface 52 terminates at an upper surface 54 of the foot portion 58. In one example, the upper surface 54 comprises a generally flat surface.

In one example, the first 48, second 50, and third 52 chamfered surfaces are at different angles relative to a horizontal plane H defined by the distal end face 62. In one example, the first 48, second 50, and third 52 chamfered surfaces are not parallel to, or perpendicular to, the horizontal plane H. Further, the first 48 and second 50 chamfered surfaces are configured such that a small clearance gap G is provided adjacent the engagement area 66 at an intersection between the first 48 and second 50 chamfered surfaces. The clearance gap and the chamfered surfaces on the foot portion 58 facilitate insertion into the aperture 24 and provide for sliding and pivoting movement of the foot portion 58 for adjustability to accommodate for any warpage of the baseplate 20.

In one example, the head portion 56 and the foot portion 58 are coupled together with at least one fastener connection 70 that comprises a male portion 72 secured to one of the head portion 56 and the foot portion 58, and a female portion 74 that receives the male portion 72. A resilient member 76 cooperates with the at least one fastener connection 70 to provide spring-loaded clamping which allows a desired range of compensation movement between the head portion 56 and the foot portion 58 along a vertical axis. In the example shown in FIG. 4, the male portion 72 comprises a threaded member that is received within an opening 78 in the head portion 56. An internal groove or trench 80 is radially outward of the opening 78 and extends around the opening 78. The foot portion 58 includes a protruding lip or rib 82 that is received within the trench 80.

In one example, the protruding lip or rib 82 extends upwardly, in a vertical direction, away from the upper surface 54 of the foot portion 58 and comprises a tapering body. The tapering body decreases in thickness from a location at the upper surface 54 to a distal end of the protruding lip or rib 82. Thus, inward and outward surfaces of the rib 82 comprise chamfered or angled surfaces that can be used to adjust for non-parallel alignment to a baseplate surface.

In one example, the internal groove or trench 80 can also have chamfered surfaces. The head portion 56 includes an end face 114 through which the male portion 72 extends. A first chamfer or open-angle surface 116 extends upwardly and outwardly in a direction away from a center of the foot 26 and transitions into a second chamfer surface 118 that forms a wall of the internal groove or trench 80. The second chamfer surface 118 terminates at an end wall surface of the internal groove or trench 80 that provides a stop surface to limit the insertion of the rib 82 into the trench 80. A third chamfered surface 120 comprises an opposite wall of the internal groove or trench 80 that is radially outward of the second chamfer surface 118. These chamfered surfaces 116, 118, 120 of the head portion 56 cooperate with the tapering body chamfered surfaces of the rib 82 in the foot portion 58 to facilitate adjustment and alignment of the foot 26 and baseplate 20.

The foot portion 58 also includes an opening 84 in the distal end face 62 that transitions into an internal cavity 86 that is narrower than the opening 84 to provide a ledge 88. The female portion 74 of the fastener connection 70 comprises a fastener body 90 with an enlarged head 92. The head 92 has an increased diameter relative to the body 90 such that the head 92 fits in the opening 84 and is capable of engaging against the ledge 88 as a stop surface. The body 90 extends into and through the internal cavity 86. The internal cavity 86 transitions into another opening 94 that is narrower than the internal cavity 86. A distal end 96 of the body 90 is received within the opening 94. The body 90 also include a threaded internal cavity 98.

The male portion 72 of the fastener connection 70 includes a head portion 100 and a threaded body 102 that has a smaller diameter than the head portion 100. The opening 78 in the head portion 56 transitions into an unthreaded cavity 104 that is narrower than the opening 78 to provide a ledge 106. The head portion 100 of the male portion 72 fits within the opening 78 such that the head portion 100 rests against the ledge 106. The threaded body 102 extends through the unthreaded cavity 104 such that a distal end 108 of the threaded body 102 extends outward from the head portion 56.

Another ledge 110 is formed within the internal cavity 86 of the foot portion 58 at a location where the internal cavity 86 transitions into the opening 94. The resilient member 76 is positioned within the internal cavity 86 and reacts between the ledge 110 and the head 92 of the female portion 74. The head portion 56 and foot portion 58 are connected to each other by threading the threaded body 102 of the male portion 72 into the threaded internal cavity 98 of the female portion 74. This threading engagement pulls the foot portion 58 toward the head portion 56 along a vertical axis. As shown in FIG. 4, the head portion 56 includes a flange 112 that surrounds the opening 78. The head portion 56 and foot portion 58 are threaded into engagement with each other such that the flange 112 of the head portion 56 sits within the recessed area 38 of the accessory 22 and the engagement area 66 of the protruding portion 64 abuts against the lower surface of the baseplate 20. The resilient member 76 allows for linear compensation movement between the head portion 56 and the foot portion 58. This provides spring-loaded clamping with a desired amount of "float" along a z-axis, i.e. the vertical axis, and to mitigate vibration. In one example, the float is approximately 2 mm; however, other amounts are possible. The float is limited by engagement of the head 92 against the ledge 88.

Figure 6:
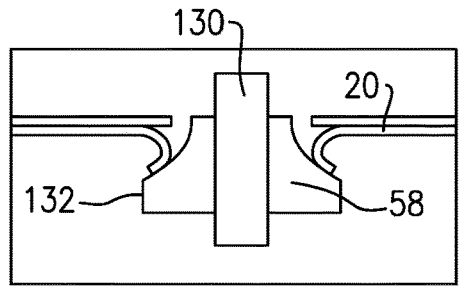
FIG. 6 is a schematic side section view of another example of an accessory mounting foot.

FIG. 6 shows another example of a foot 26 that uses a center pin 130 to push out an outer periphery 132 of the foot portion 58 to lock the feet 26 to the baseplate 20.

Figure 7:
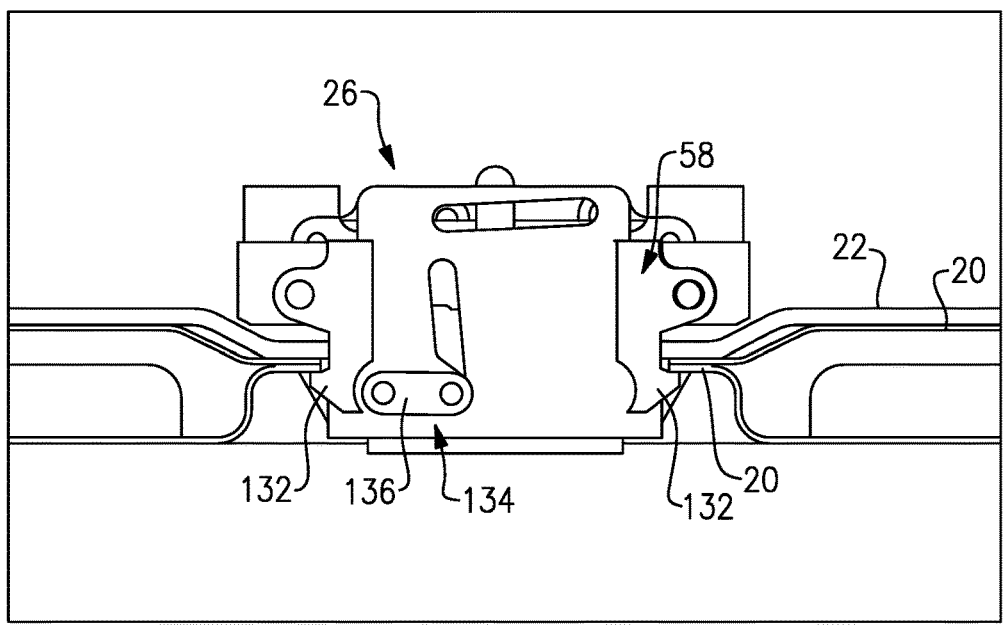
FIG. 7 is a schematic side section view of another example of an accessory mounting foot associated with a locking mechanism.
Figure 8:
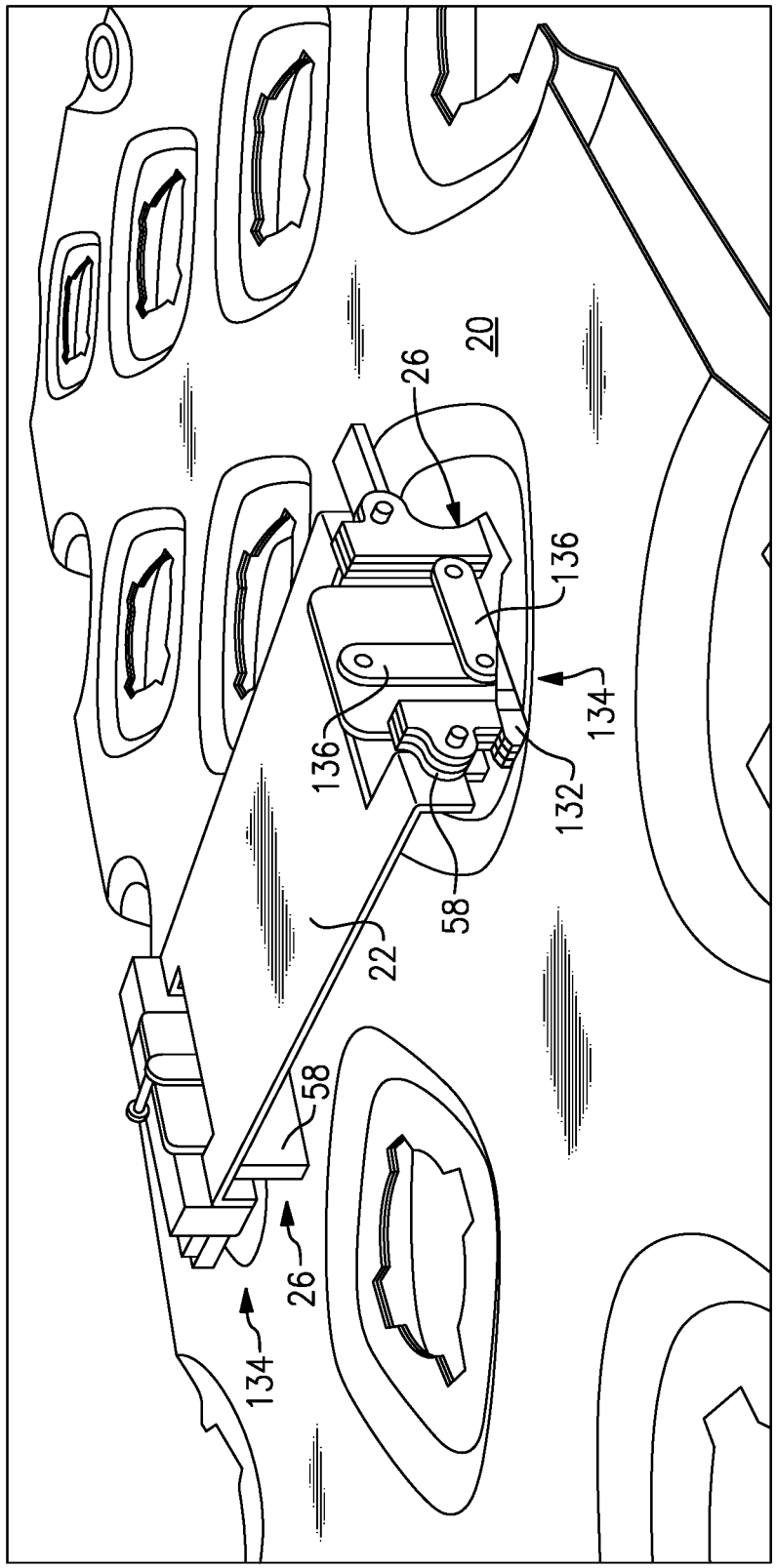
FIG. 8 is a perspective view of two accessory mounting feet and a locking mechanism from FIG. 7 for one accessory.

FIGS. 7-8 shows a latch mechanism 134 that is used to move the outer periphery 132 of the foot portion 58 to the locked and loaded position as shown. In one example, the latch mechanism 134 comprises a linkage system utilizing a plurality of link members 136 that cooperate to pull the outer periphery 132 of the foot 26 inwardly such that the foot 26 can be pulled out of the baseplate 20, and cooperate to push the outer periphery 132 outwardly such that the foot 26 is locked in place as shown in FIG. 7. In one example, the center pin 130 is used to manually actuate the latch mechanism 134. The linkage system is just one example of a latch mechanism 134 that could be used other linkage configurations and other types of latch mechanisms could also be used.

Figure 9:
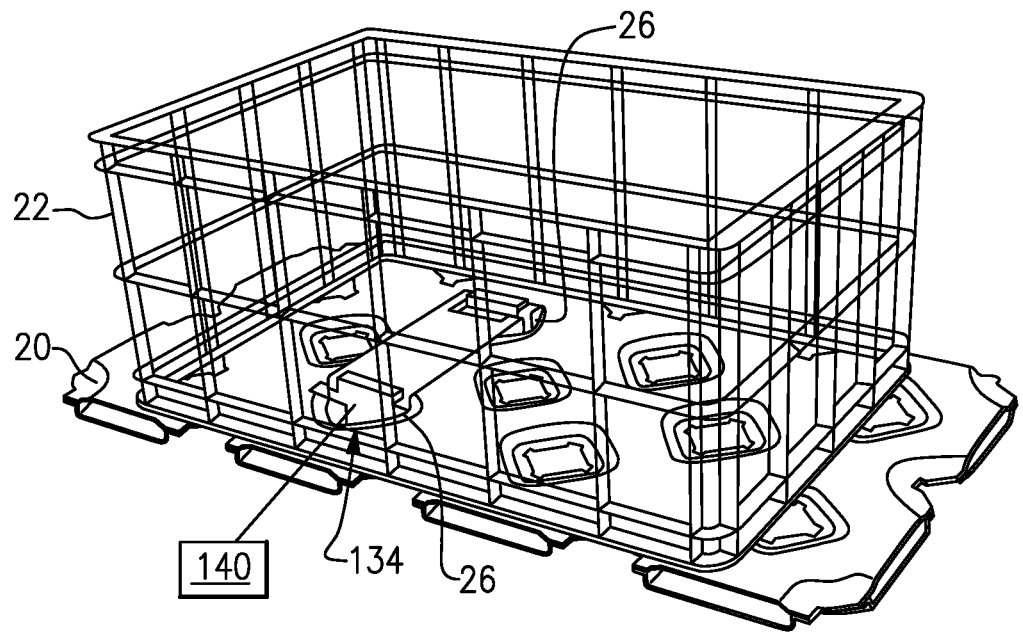
FIG. 9 is a perspective view of an accessory box mounted to the baseplate with a pair of accessory mounting feet coupled to an actuator to initiate locking/unlocking.

FIGS. 8-9 show configurations where a plurality of latch mechanisms 134 are used for one accessory 22. FIG. 9 also shows a configuration where the latch mechanism 134 is configured to be actuated by an electronic actuator 140. Any type of electronic actuator could be used such as a motor, solenoid, etc.

Figure 10:
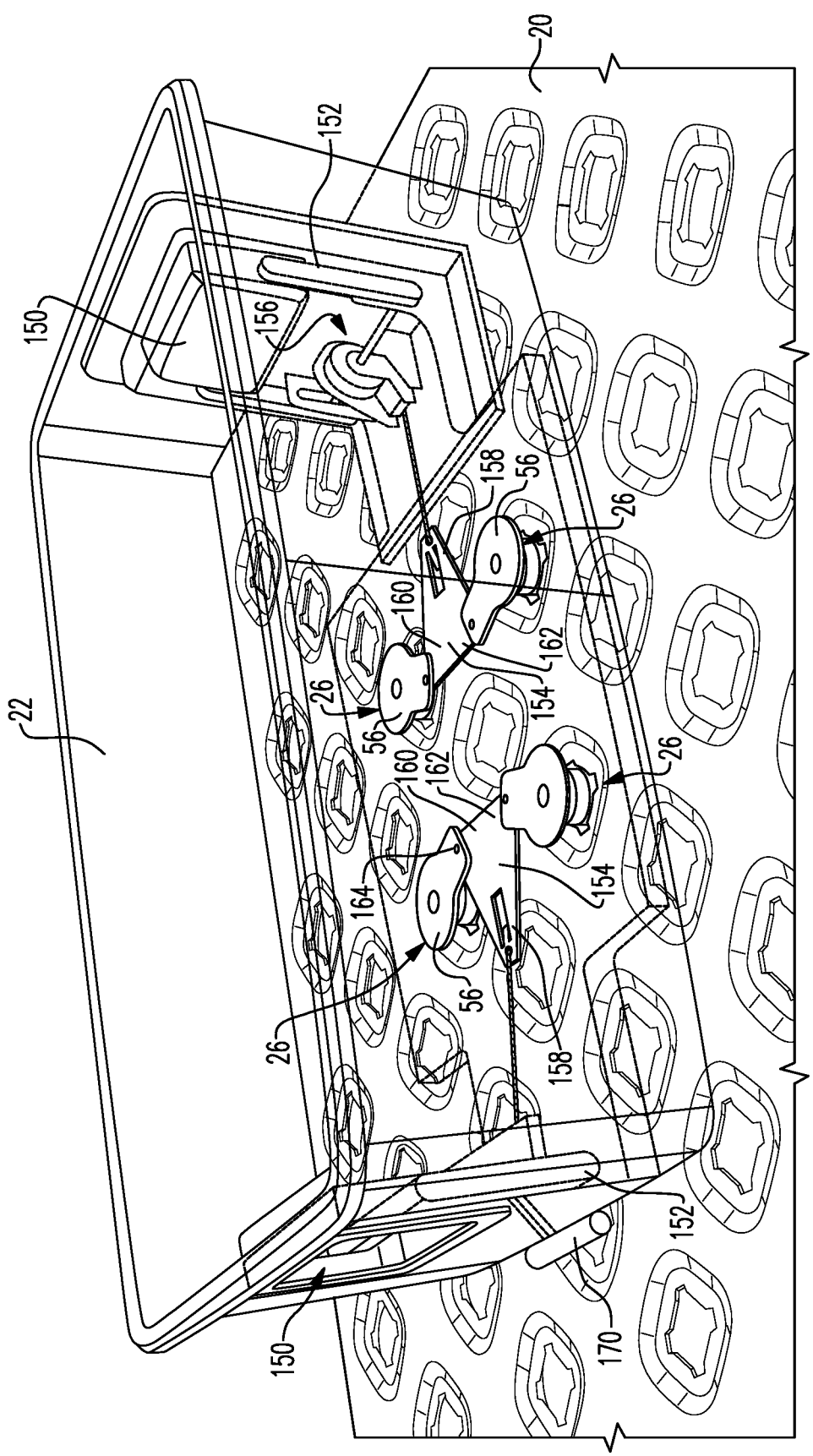
FIG. 10 is a perspective view of another example of an accessory box that is mounted to the baseplate with four mounting feet with pairs of mounting feet each being mechanically coupled to a lock handle.

FIG. 10 shows an example configuration where a side handle 150 for the accessory box 22 is used to move the feet 26 between the locked and unlocked positions. In this example, the accessory box has two handles 150, with one handle 150 being on one side of the box and another handle 150 being on the opposite side of the box. Each handle 150 is configured to simultaneously actuate two feet 26. The handles 150 each include a slide mechanism 152 that is coupled to an actuation plate 154 via a linkage and/or pulley/cable system 156. In one example, the actuation plate 154 comprises a triangular shaped plate having a first portion 158 coupled to the linkage and/or pulley/cable system 156, a second portion 160 coupled to the head portion 56 of one foot 26, and a third portion 162 coupled to the head portion 56 of another foot 26. A first pivot 164 couples the second portion 160 to the one foot and a second pivot 166 coupled the third portion 162 to the other foot 26. As the handle 150 is pulled upwardly in a vertical direction relative to the box, the handle 150 slides up the slide mechanism 152 causing the linkage and/or pulley/cable system 156 to pull the first portion 158 of the actuation plate 154 in a horizontal direction, which in turn pivots/rotates the feet 26 about the first 164 and second 166 pivots to unlock the accessory box 22 from the baseplate 20. A reverse motion locks the accessory box 22 to the baseplate 20.

Each handle 150 can be operated independently of the other handle 150. In one example, a side lever 170 is used to provide a positive lock to prevent the side handle 150 from unlocking. Optionally, the side lever 170 could be used to replace one or both handles.

In another example, the actuation plate 154 could be coupled to an electronic actuator 140 similar to that described above.

The number of handles and locking feet can be increased or decreased depending upon the size of the accessory 22.

Figure 11:
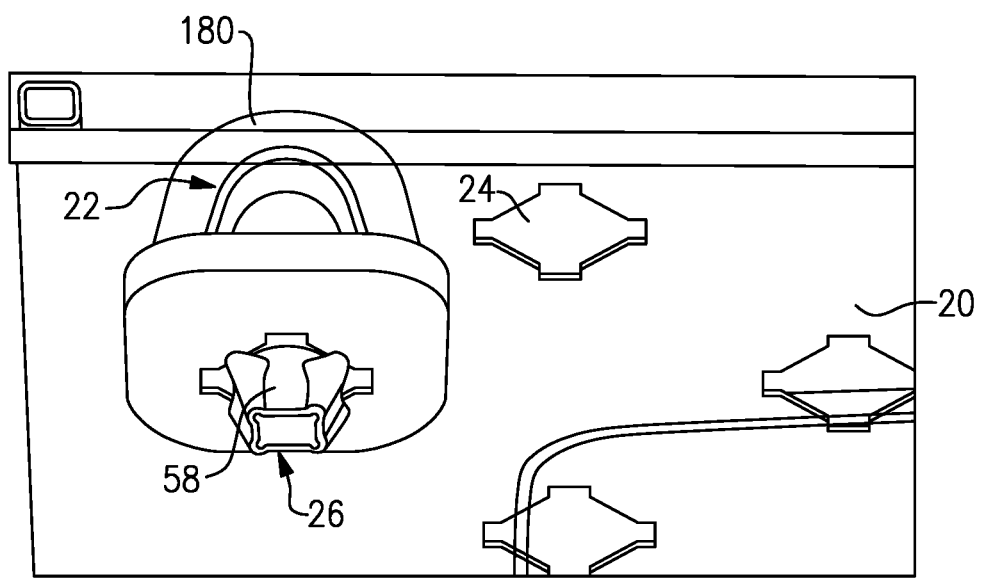
FIG. 11 is another example of an accessory mounting foot that includes a tie-down.

In another example shown in FIG. 11, the locking foot 26 is used for a tie-down 180. The tie-down 180 comprises a closed mounting loop that can be locked into place on the baseplate 20 such that ropes, cables, strips, etc. can be tied off on the loop to hold cargo in place.

In one example, the accessory 22 includes an interior power locking mechanism 180 (FIG. 2) that can be wirelessly actuated. The interior power locking mechanism 180 can comprise the latch mechanism 134 or actuation plate 154, for example. The interior power locking mechanism 180 can be Bluetooth Low Energy (BLE) actuated by a vehicle control module C.

In one example, a position sensor/limit switch 182 can tell if the feet 26 have moved to the locked position. This information can be broadcast to the vehicle and/or user smart device 184 via BLE when the lock position is detected.

In one example, the locking mechanism 178 automatically locks or unlocks in response to a vehicle operation status, a vehicle location, and/or a designated type of person.

In another example, the accessory 22 includes exterior lighting 186 that changes based on a vehicle operation status and/or a locked/unlocked condition of the accessory 22.

For example, a locking mechanism associated with the accessory 22 can automatically lock if vehicle 10 goes into drive. There can also be auto lock/unlock with a drive state such as Park or a GPS location, e.g. home, garage, or yard.

In one example, accessories 22 can unlock automatically for authorized people, such as by using facial recognition via a camera 188, BLE triangulation/recognition of phone-as-a-key (PaaK) or other type of electronic identification card. If the accessories 22 are in an unlocked state they can lock when unauthorized/unrecognized people approach as detected by radar and/or cameras 188. A central locking command can also be selectively communicated with a key fob or PaaK In one example, exterior lighting 186 of accessories 22 changes with drive mode/locked/unlocked state. Additionally, lighting 186 could strobe if the vehicle goes into a drive mode for boxes not returned to the vehicle or not locked on the vehicle.

In one example, the accessories 22 operate or lock differently on a vehicle as compared to a stationary application on wall or away from truck. For example, if the accessories 22 are away from the vehicle they can be programmed not to lock or can be programmed to automatically lock if placed on a work bench. The orientation as measured by a sensor can be used to determine and identify conditions for locking and unlocking.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An accessory attachment system, comprising:
a baseplate that provides an attachment interface on a support surface, the baseplate configured to engage with at least one accessory via the attachment interface to secure the at least one accessory to the support surface, and wherein the attachment interface provides a plurality of different mounting positions for the at least one accessory; and
at least one mounting foot associated with the at least one accessory and configured to be selectively coupled to the attachment interface to provide a desired one of the plurality of different mounting positions, and wherein the at least one mounting foot has a distal end face and protruding portions formed about an outer periphery of the at least one mounting foot, and wherein the protruding portions taper outwardly from the distal end face to an engagement area that is configured to engage a lower surface of the baseplate, and wherein the at least one mounting foot includes an adjustment feature to account for any warpage of the support surface when the at least one accessory is mounted in the desired one of the plurality of different mounting positions.

2. The accessory attachment system of claim 1, wherein the attachment interface comprises a plurality of mounting holes formed within the baseplate, and wherein the at least one mounting foot has a head portion associated with the at least one accessory and a foot portion to be inserted into one of the plurality of mounting holes.

3. An accessory attachment system, comprising:
a baseplate that provides an attachment interface on a support surface, the baseplate configured to engage with at least one accessory via the attachment interface to secure the at least one accessory to the support surface, wherein the attachment interface comprises a plurality of mounting holes formed within the baseplate, and wherein the attachment interface provides a plurality of different mounting positions for the at least one accessory;
at least one mounting foot associated with the at least one accessory and configured to be selectively coupled to the attachment interface to provide a desired one of the plurality of different mounting positions, wherein the at least one mounting foot has a head portion associated with the at least one accessory and a foot portion to be inserted into one of the plurality of mounting holes, and wherein the at least one mounting foot includes an adjustment feature to account for any warpage of the support surface when the at least one accessory is mounted in the desired one of the plurality of different mounting positions; and
wherein the head portion and foot portion are coupled together with a spring-loaded fastener assembly such that the foot portion can move relative to the head portion along an axial direction to provide vertical compensation and to mitigate vibration.

4. The accessory attachment system of claim 3, wherein one of the head portion and foot portion includes a channel and the other of the head portion and the foot portion includes a protrusion that is received within the channel such that pivotal movement can occur between the head portion and the foot portion to account for the warpage.

5. The accessory attachment system of claim 4, wherein the protrusion extends from a base surface to a distal end, and wherein the protrusion decreases in thickness in a direction toward the distal end.

6. The accessory attachment system of claim 5, wherein the channel has a chamfered entrance to facilitate insertion of the protrusion into the channel.

7. The accessory attachment system of claim 3, wherein the foot portion includes chamfered surfaces to facilitate insertion of the foot portion into the one of the plurality of mounting holes.

8. The accessory attachment system of claim 2, wherein the foot portion is selectively moveable between a locked position where the at least one mounting foot cannot be detached from the baseplate and an unlocked position where the at least one mounting foot can be detached from the baseplate.

9. The accessory attachment system of claim 8, wherein the plurality of mounting holes are each configured to receive the foot portion such that once the foot portion is inserted through a selected one of the plurality of mounting holes, the head portion is then rotated to move the foot portion into the locked position.

10. The accessory attachment system of claim 2, wherein the plurality of mounting holes each have a diamond shape.

11. The accessory attachment system of claim 1, wherein the at least one accessory includes an interior power locking mechanism that can be wirelessly actuated.

12. The accessory attachment system of claim 1, including a position sensor and/or limit switch that can determine if the at least one mounting foot has moved to a locked position, and wherein a locking condition is wirelessly communicated to a user interface when a lock position is detected.

13. The accessory attachment system of claim 1, wherein the at least one accessory includes a locking mechanism that automatically locks or unlocks in response to a vehicle operation status, a vehicle location, and/or a designated type of person.

14. The accessory attachment system of claim 1, wherein the at least one accessory includes exterior lighting that changes based on a vehicle operation status and/or a locked/unlocked condition of the at least one accessory.

15. The accessory attachment system of claim 1, wherein the protruding portions are spaced apart from each other and gradually and continuously increase in thickness from the distal end face to the engagement area to provide an angled or beveled side surface.

16. The accessory attachment system of claim 1, wherein the at least one mounting foot has a head portion and a foot portion that is moveable relative to the head portion along a vertical axis to provide a desired adjustment range of compensation.

17. The accessory attachment system of claim 1, wherein the lower surface of the baseplate comprises a planar surface that surrounds a mounting hole within which the at least one mounting foot is received.

18. An accessory attachment system, comprising:
a baseplate that provides an attachment interface on a support surface, the baseplate configured to engage with at least one accessory via the attachment interface to secure the at least one accessory to the support surface, and wherein the attachment interface provides a plurality of different mounting positions for the at least one accessory; and
at least one mounting foot associated with the at least one accessory and configured to be selectively coupled to the attachment interface to provide a desired one of the plurality of different mounting positions, and wherein the at least one mounting foot has a distal end face and protruding portions spaced apart from each other about an outer periphery of the at least one mounting foot, and wherein the protruding portions taper outwardly from the distal end face to an engagement area that is configured to engage a lower surface of the baseplate, and wherein the at least one mounting foot includes an adjustment feature that includes rotational movement about a vertical axis defined by the at least one mounting foot and/or linear movement along the vertical axis.

19. The accessory attachment system of claim 18, wherein the protruding portions gradually and continuously increase in thickness from the distal end face to the engagement area to provide an angled or beveled side surface.

20. The accessory attachment system of claim 18, wherein the at least one mounting foot has a head portion and a foot portion that is independently moveable relative to the head portion.

* * * * *